(12) United States Patent
Zhang et al.

(10) Patent No.: US 12,395,572 B2
(45) Date of Patent: Aug. 19, 2025

(54) PACKET PROCESSING METHOD

(71) Applicant: HUAWEI TECHNOLOGIES CO., LTD., Shenzhen (CN)

(72) Inventors: Yongkang Zhang, Nanjing (CN); Zhongzhen Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 623 days.

(21) Appl. No.: 17/533,216

(22) Filed: Nov. 23, 2021

(65) Prior Publication Data

US 2022/0109745 A1    Apr. 7, 2022

Related U.S. Application Data

(63) Continuation of application No. PCT/CN2020/091935, filed on May 22, 2020.

(30) Foreign Application Priority Data

May 24, 2019  (CN) ......................... 201910441426.3

(51) Int. Cl.
*H04L 12/723*  (2013.01)
*H04L 12/725*  (2013.01)
(Continued)

(52) U.S. Cl.
CPC .............. *H04L 69/22* (2013.01); *H04L 45/34* (2013.01)

(58) Field of Classification Search
CPC ......... H04L 69/06; H04L 45/50; H04L 45/74; H04L 49/70; H04L 69/22; H04L 12/4633;
(Continued)

(56) References Cited

U.S. PATENT DOCUMENTS 10,461,958 B2 * 10/2019 Ao ..................... H04L 12/46
2015/0043328 A1 * 2/2015 Gan ................ H04L 43/0817
370/218
(Continued)

FOREIGN PATENT DOCUMENTS

CN     104579973 A     4/2015
CN     105743822 A     7/2016
(Continued)

OTHER PUBLICATIONS

Filsfils et al., "Segment Routing Architecture", Internet Engineering Task Force (IETF), RFC 8402, Jul. 2018; 32 Pages.
(Continued)

*Primary Examiner* — Edan Orgad
*Assistant Examiner* — Vanneilian Lalchinthang
(74) *Attorney, Agent, or Firm* — Maier & Maier, PLLC

(57) ABSTRACT

A packet processing method, to improve a success rate of packet forwarding. The method implemented by a service function forwarder (SFF) includes: receiving a first packet; replacing a first packet header of the first packet with a second packet header to obtain a second packet, where the second packet includes a first identifier uniquely identified the first packet header; sending the second packet to a service function (SF) device; receiving a third packet from the SF, the third packet includes the first identifier; replacing a third packet header of the third packet with the first packet header to obtain a fourth packet; and sending the fourth packet to a next-hop node.

14 Claims, 7 Drawing Sheets

(51) Int. Cl.
  *H04L 12/741* (2013.01)
  *H04L 29/06* (2006.01)
  *H04L 45/00* (2022.01)
  *H04L 69/22* (2022.01)
  *H04N 21/84* (2011.01)

(58) Field of Classification Search
  CPC ..... H04L 12/4641; H04L 45/34; H04L 69/08; H04L 69/18; H04L 45/306; H04L 47/35; H04L 49/354; H04L 67/28; H04L 67/56; H04L 12/46; H04N 21/8352; H04N 21/2353; H04N 21/23605; H04N 21/278; H04N 21/84; G06F 9/45558; G06F 9/455; G06F 2009/45595
  USPC ......................................................... 370/392
  See application file for complete search history.

(56) References Cited

U.S. PATENT DOCUMENTS

| | | | | |
|---|---|---|---|---|
| 2015/0092551 | A1* | 4/2015 | Moisand | H04L 67/146 370/235 |
| 2017/0005920 | A1* | 1/2017 | Previdi | H04L 12/4633 |
| 2017/0085477 | A1* | 3/2017 | Li | H04L 69/18 |
| 2017/0134538 | A1* | 5/2017 | Mahkonen | H04L 69/22 |
| 2017/0180824 | A1* | 6/2017 | Casey | H04N 21/47208 |
| 2017/0237656 | A1* | 8/2017 | Gage | H04L 61/2521 370/392 |
| 2017/0244631 | A1* | 8/2017 | Guichard | H04L 45/306 |
| 2018/0152374 | A1* | 5/2018 | Yong | H04L 47/31 |
| 2018/0198705 | A1* | 7/2018 | Wang | H04L 45/50 |
| 2018/0375968 | A1* | 12/2018 | Bashandy | H04L 45/741 |
| 2019/0394211 | A1* | 12/2019 | Filsfils | H04L 45/7453 |
| 2020/0145331 | A1* | 5/2020 | Bhandari | H04L 9/3218 |

FOREIGN PATENT DOCUMENTS

| | | |
|---|---|---|
| CN | 106330714 A | 1/2017 |
| CN | 107911258 A | 4/2018 |
| CN | 108173694 A | 6/2018 |
| CN | 108199958 A | 6/2018 |
| CN | 108702331 A | 10/2018 |
| CN | 109728962 A | 5/2019 |
| CN | 109756521 A | 5/2019 |
| EP | 3322135 A1 | 5/2018 |
| EP | 3355519 A1 | 8/2018 |
| WO | 2016165492 A1 | 10/2016 |
| WO | WO-2018006675 A1 * | 1/2018 |
| WO | 2020182085 A1 | 9/2020 |
| WO | WO-2020220987 A1 * | 11/2020 ........... H04L 12/725 |

OTHER PUBLICATIONS

Halpern et al., "Service Function Chaining (SFC) Architecture", Internet Engineering Task Force (IETF), RFC 7665, Oct. 2015; 32 Pages.
Quinn et al., "Network Service Header (NSH)", Internet Engineering Task Force (IETF), RFC 8300, Jan. 2018; 40 Pages.
Deering et al., "Internet Protocol, Version 6 (IPv6) Specification", Internet Engineering Task Force (IETF), RFC 8200, Jul. 2017; 42 Pages.
Mahalingam et al., "Virtual eXtensible Local Area Network (VXLAN): A Framework for Overlaying Virtualized Layer 2 Networks over Layer 3 Networks", Independent Submission, RFC 7348, Aug. 2014; 22 Pages.
Farinacci et al, "Generic Routing Encapsulation (GRE)", Network Working Group, RFC 2784, Mar. 2000, 9 Pages.
Pignataro et al., "IPv6 Support for Generic Routing Encapsulation (GRE)", Internet Engineering Task Force (IETF), RFC 7676, Oct. 2015; 11 Pages.
Conta et al., "Generic Packet Tunneling in IPV6 Specification", Network Working Group, RFC 2473, Dec. 1998; 36 Pages.
Filsfils et al., "SRv6 Network Programming; draft-filsfils-spring-srv6-network-programming-05", Spring, Jul. 2, 2018, 53 Pages.
Filsfils et al., "IPv6 Segment Routing Header (SRH); draft-ietf-6man-segment-routing-header-14", Network Working Group, Jun. 28, 2018; 29 Pages.
Gross et al., "Geneve: Generic Network Virtualization Encapsulation; draft-ietf-nvo3-geneve-08", Network Working Group, Oct. 7, 2018; 29 Pages.
Maino et al., "Generic Protocol Extension for VXLAN; draft-ietf-nvo3-vxlan-gpe-06", Network Working Group, Apr. 30, 2018; 17 Pages.
Filsfils et al., "Segment Routing Policy Architecture; draft-ietf-spring-segment-routing-policy-02.txt", Spring Working Group, Oct. 22, 2018; 33 Pages.
Clad et al., "Service Programming with Segment Routing; draft-xuclad-spring-sr-service-programming-00", Spring, Jul. 2, 2018; 30 Pages.
Bashandy et al., "Topology Independent Fast Reroute using Segment Routing; draft-bashandy-rtgwg-segment-routing-ti-lfa-05", Network Working Group, Oct. 4, 2018; 19 Pages.
Clad et al., "Service Programming with Segment Routing; draft-xuclad-spring-sr-service-programming-01", Spring, Oct. 22, 2018; 31 Pages.

* cited by examiner

PACKET PROCESSING METHOD

CROSS-REFERENCE TO RELATED APPLICATIONS

This application is a continuation of International Application No. PCT/CN2020/091935, filed on May 22, 2020, which claims priority to Chinese Patent Application No. 201910441426.3, filed on May 24, 2019. The disclosures of the aforementioned applications are hereby incorporated by reference in their entireties.

TECHNICAL FIELD

The embodiments relate to the computer field, and in particular, to a packet processing method, a service function forwarder, a service function device, and a packet processing system.

BACKGROUND

As a forwarding node on a service chain, a service function forwarder (SFF) is configured to forward a packet received in a network to at least one service function (SF) device associated with the SFF. After the packet is parsed by the SF, the SF returns the packet to the same SFF. After the last SF on the service chain sends the processed packet to the SFF, the SFF sends the packet back to the network for transmission. When the following case occurs in the network, for example, if the SFF can normally parse a packet header of the received data packet, but the SF cannot normally parse the data packet forwarded by the SFF, a communication error may be caused.

SUMMARY

Embodiments provide a packet processing method, a service function forwarder, and a service function device, to improve a success rate of packet forwarding.

In view of this, a first aspect of an embodiment provides a packet processing method. The method may include:

After receiving a first packet, a service function forwarder (SFF) determines a type of the first packet and a service function (SF) device that processes the packet. Then, the SFF replaces a first packet header of the first packet with a second packet header to obtain a second packet. The second packet includes a first identifier. It should be noted that a type of the second packet header may be different from the type of the first packet header. The second packet header is a packet header that can be parsed by the SF. After generating the second packet, the SFF sends the second packet to the SF, and receives, from the SF, a third packet obtained after the SF processes the second packet based on the second packet header. The third packet further includes the first identifier. The SFF locally stores the third packet, parses the third packet to obtain the first identifier, and determines, based on a preset mapping relationship between the first identifier and the first packet header, the first packet header corresponding to the first identifier. Finally, the SFF replaces a third packet header of the third packet with the first packet header to obtain a fourth packet, determines a next hop based on the first packet header, and sends the fourth packet to a next-hop node. In this embodiment, after the SFF obtains the first packet, if the SF connected to the SFF cannot parse the first packet or in another case, the SFF replaces the first packet header of the first packet with the second packet header that can be parsed by the SF, to obtain the second packet. Then, the SFF sends the second packet to the SF. The second packet includes the first identifier corresponding to the first packet header. When the third packet obtained after the SF processes the second packet is received, the third packet further includes the first identifier. Therefore, the SFF can parse the third packet to obtain the first identifier. Further, the SFF obtains the pre-stored first packet header through query based on the first identifier and the mapping relationship between the first identifier and the first packet header, generates the fourth packet based on the third packet and the pre-stored first packet header, and sends the fourth packet the next hop. According to the foregoing method, the SF processes the first packet. Therefore, the device on a service chain is more compatible with the first packet. In addition, the first identifier is set for the first packet header to avoid a case in which an encapsulation error is caused by a query error in subsequent encapsulation because the first packet header is replaced.

In a specific implementation, the first packet header is a segment routing (SR) packet header. In this embodiment, a form of the first packet header is merely used as an example for description, to improve applicability of the solution.

In a specific embodiment, the first packet header is a packet header that cannot be parsed by the SF. In this embodiment, a specific application scenario is provided in the solution. For example, when the first packet header cannot be parsed by the SF, the SFF generates the second packet header, replaces the first packet header of the first packet to obtain the second packet, and sends the second packet to the SF, so that the SF can parse the second packet, and process corresponding service data. This avoids a case in which processing fails because the SF cannot process the first packet.

In a specific design, before the SFF replaces a first packet header of the first packet with a second packet header, the method further includes: if the first packet header exists locally, the SFF determines the first identifier based on the preset mapping relationship between the first packet header and the first identifier; or if the first packet header does not exist locally, the SFF allocates the first identifier to the first packet header, and stores the mapping relationship between the first identifier and the first packet header. In this embodiment, after obtaining the first packet, the SFF may first query whether the first packet header exists locally. If the first packet header exists locally, the SFF directly queries the first identifier corresponding to the first packet header. Otherwise, the SFF stores the first packet header, and allocates the first identifier to the first packet header. Whether the first packet header exists locally is determined, to avoid repeated buffering of the first packet header, and reduce storage pressure of the device.

In a specific design, the second packet further includes a second identifier. The second identifier is used to indicate that the second packet includes the first identifier and instruct to add the first identifier to the third packet. In this embodiment, the second packet may further carry the second identifier, so that the SF can determine, based on the second identifier, whether the second packet includes the first identifier. This avoids an unnecessary read operation of the SF when the second packet does not carry the first identifier, and reduces operation pressure of the SF.

In a specific design, the third packet further includes a third identifier. The method further includes: the SFF obtains the first identifier according to indication of the third identifier. In this embodiment, it is pointed out that the third packet further includes the third identifier, so that the SFF may determine, based on the third identifier, whether the third packet includes the first identifier. This avoids an unnecessary read operation that may exist and reduces operation pressure of the SFF.

A second aspect of an embodiment provides a packet processing method. The method may include:

After receiving a first packet from a service function forwarder (SFF), a service function (SF) device locally stores the first packet. The first packet includes a first identifier. Then, the SF processes the first packet based on a packet header of the first packet to obtain a second packet. In this processing process, the SF may simultaneously process or not process the packet header of the first packet based on different service data processing processes. Therefore, a packet header of the obtained second packet may be the same as or different from the packet header of the first packet. After obtaining the second packet, the SF sends the second packet to the SFF. It should be noted that the second packet includes the first identifier. Therefore, after receiving the second packet, the SFF can obtain a prestored target packet header through query based on the first identifier.

In a specific design, the target packet header is a segment routing (SR) packet header. In this embodiment, a form of the first packet header is merely used as an example for description, to improve applicability of the solution.

In a specific implementation, the first packet also includes a second identifier. Before the SF sends a third packet to the SFF, the method further includes: the SF obtains the first identifier according to indication of the second identifier, and adds the first identifier to the third packet. In this embodiment, the second packet may further carry the second identifier, so that the SF can determine, based on the second identifier, whether the second packet includes the first identifier. This avoids an unnecessary read operation of the SF when the second packet does not carry the first identifier, and reduces operation pressure of the SF.

In a specific design, the method further includes: the SF adds a third identifier to the third packet. The third identifier is used to indicate that the third packet includes the first identifier. In this embodiment, the SF may further add the third identifier to the third packet, so that the SFF may determine, based on the third identifier, whether the third packet includes the first identifier. This avoids an unnecessary read operation that may exist, and reduces operation pressure of the SFF.

A third aspect of an embodiment provides a service function forwarder (SFF). The service function forwarder (SFF) may include:
 a transceiver unit, configured to receive a first packet; and
 a processing unit, configured to replace a first packet header of the first packet with a second packet header to obtain a second packet, where the second packet includes a first identifier.

The transceiver unit is further configured to: send the second packet to a service function (SF) device; and receive a third packet from the SF. The third packet is obtained after the SF processes the second packet based on the second packet header. The third packet includes the first identifier.

The processing unit is further configured to: determine, based on a mapping relationship between the first identifier and the first packet header, the first packet header corresponding to the first identifier; and replace a third packet header of the third packet with the first packet header to obtain a fourth packet.

The transceiver unit is further configured to send the fourth packet to a next-hop node.

In a specific design, the first packet header is a segment routing (SR) packet header.

In a specific implementation, the first packet header is a packet header that cannot be parsed by the SF.

In a specific implementation, the processing unit is further configured to: if the first packet header exists locally, determine the first identifier based on the preset mapping relationship between the first packet header and the first identifier; or if the first packet header does not exist locally, allocate the first identifier to the first packet header, and store the mapping relationship between the first identifier and the first packet header.

In a specific implementation, the second packet further includes a second identifier. The second identifier is used to indicate that the second packet includes the first identifier and instruct to add the first identifier to the third packet.

In a specific implementation, the third packet further includes a third identifier.

The processing unit is further configured to obtain the first identifier according to indication of the third identifier.

A fourth aspect of an embodiment provides a service function device. The service function device may include:
 a transceiver unit, configured to receive a first packet from a service function forwarder (SFF), where the first packet includes a first identifier; and
 a processing unit, configured to process the first packet based on a packet header of the first packet to obtain a second packet.

The transceiver unit is further configured to send the second packet to the SFF. The second packet includes the first identifier. The first identifier is used to instruct the SFF to obtain a prestored target packet header through query based on the first identifier.

In a specific implementation, the target packet header is a segment routing (SR) packet header.

In a specific implementation, the first packet also includes a second identifier.

The transceiver unit is further configured to obtain the first identifier according to indication of the second identifier and add the first identifier to the third packet.

In a specific implementation, the transceiver unit is further configured to add a third identifier to the third packet. The third identifier is used to indicate that the first packet includes the first identifier.

A fifth aspect of an embodiment provides a service function forwarder. The service function forwarder may include:
 a processor, a memory, and a transceiver. The processor and the transceiver are connected to the memory.

The transceiver is configured to receive a first packet and store the first packet in the memory.

The processor is configured to read the first packet from the memory, replace a first packet header of the first packet with a second packet header to obtain a second packet. The second packet includes a first identifier.

The transceiver is further configured to obtain the second packet from the memory, send the second packet to a service function (SF) device, receive a third packet from the SF, and store the third packet in the memory. The third packet is obtained after the SF processes the second packet based on the second packet header. The third packet includes the first identifier.

The processor is further configured to read the first identifier from the memory, determine, based on a mapping relationship between the first identifier and the first packet header, the first packet header that is in the memory and that corresponds to the first identifier, read the third packet from the memory, and replace a third packet header of the third packet with the first packet header to obtain a fourth packet.

The transceiver is further configured to obtain the fourth packet from the memory, and send the fourth packet to a next-hop node.

In a specific implementation, the first packet header is a segment routing (SR) packet header.

In a specific implementation, the first packet header is a packet header that cannot be parsed by the SF.

In a specific implementation, the processor is further configured to: if the first packet header exists locally, determine the first identifier based on the preset mapping relationship between the first packet header and the first identifier; or if the first packet header does not exist locally, allocate the first identifier to the first packet header, and store the mapping relationship between the first identifier and the first packet header.

In a specific implementation, the second packet further includes a second identifier. The second identifier is used to indicate that the second packet includes the first identifier and instruct to add the first identifier to the third packet.

The first packet header is a packet header that cannot be parsed by the SF.

The third packet further includes a third identifier. The processor is further configured to obtain the first identifier from the memory according to indication of the third identifier.

A sixth aspect of an embodiment provides a service function (SF) device. The service function (SF) device may include:

a processor, a memory, and a transceiver. The processor and the transceiver are connected to the memory.

The transceiver is configured to receive a first packet from a service function forwarder (SFF) and store the first packet in the memory. The first packet includes a first identifier.

The processor is configured to read the first packet from the memory and process the first packet to obtain a second packet.

The transceiver is further configured to obtain the second packet from the memory and send the second packet to the SFF. The second packet includes the first identifier. The first identifier is used to instruct the SFF to obtain a prestored target packet header through query based on the first identifier. In a specific design, the target packet header is a segment routing (SR) packet header.

In a specific implementation, the first packet also includes a second identifier. The processor is further configured to read the second identifier, obtain the first identifier according to indication of the second identifier, and add the first identifier to the third packet.

In a specific implementation, the processor is further configured to add a third identifier to the third packet. The third identifier is used to indicate that the third packet includes the first identifier.

A seventh aspect of an embodiment provides a message processing system. The system may include:

a service function forwarder and a service function device.

The service function forwarder includes the service function forwarder according to any one of the third aspect, the fifth aspect, or a specific embodiment of the third aspect and the fifth aspect.

The service function device includes the service function forwarder according to any one of the fourth aspect, the sixth aspect, or a specific embodiment of the fourth aspect and the sixth aspect.

An eighth aspect of an embodiment provides a computer storage medium including instructions. When the instructions are run on a computer, the computer is enabled to perform the method according to any one of the first aspect, the second aspect, or a specific embodiment of the first aspect and the second aspect.

A ninth aspect of an embodiment provides a computer program product including instructions. When the computer program product runs on a computer, the computer is enabled to perform the method according to any one of the first aspect, the second aspect, or a specific embodiment of the first aspect and the second aspect.

It can be understood from the foregoing solutions that the embodiments have the following advantages:

After the SFF obtains the first packet, if the SF connected to the SFF cannot parse the first packet or in another case, the SFF replaces the first packet header of the first packet with the second packet header that can be parsed by the SF, to obtain the second packet. Then, the SFF sends the second packet to the SF. The second packet includes the first identifier corresponding to the first packet header. When the third packet obtained after the SF processes the second packet is received, the third packet further includes the first identifier. Therefore, the SFF can parse the third packet to obtain the first identifier. Further, the SFF obtains the pre-stored first packet header through query based on the first identifier and the mapping relationship between the first identifier and the first packet header, generates the fourth packet based on the third packet and the pre-stored first packet header, and sends the fourth packet the next hop. According to the foregoing method, the SF processes the first packet. Therefore, the device on the service chain is more compatible with the first packet. In addition, the first identifier is set for the first packet header to avoid a case in which an encapsulation error is caused by a query error in subsequent encapsulation because the first packet header is replaced.

DETAILED DESCRIPTION OF THE EMBODIMENTS

With reference to the accompanying drawings, the following describes in detail a packet processing method, a service function forwarder, and a service function device that are provided in embodiments.

The embodiments are applicable to the computer field, and may be applicable to a plurality of types of packet forwarding and processing processes. For example, the embodiments are not limited to packet forwarding and processing when an SR technology is used to forward a packet.

Segment routing (SR) is a tunneling technology based on a source route forwarding mode. A head node is used to specify a path for a packet, so that the packet is forwarded and processed on a routing node according to the specified path. The packet forwarded by using an SR technology includes an SR packet header and a payload part. The SR packet header includes indication information about a forwarding path. The payload part is used to carry service data.

Figure 1:
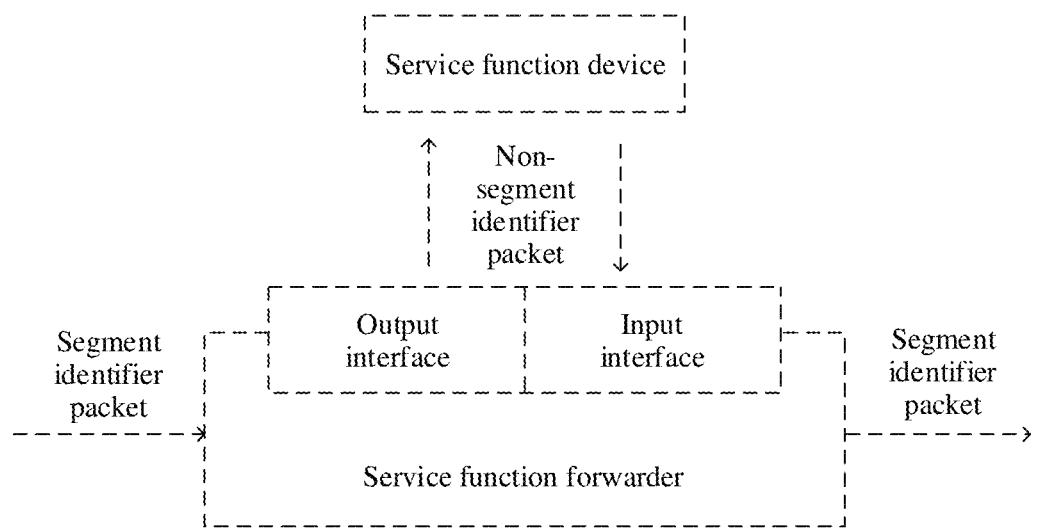
FIG. 1 is a schematic diagram of an application scenario according to an embodiment.

FIG. 1 is a schematic diagram of an application scenario according to an embodiment. The application scenario shown in FIG. 1 may be a service chain including a plurality of service function forwarders (SFF), service function (SF) devices, and routing nodes (router). The SFF forwards a packet at a service layer to the SF or a next hop. The SF represents a device providing a virtual network function, may be connected to the SFF in a one-armed mode or a serial mode, and is configured to provide a specific network service, such as a firewall, network address translation (NAT), or quality of service (QoS), et al. The SF may be a physical device or a virtual device.

In the application scenario shown in FIG. 1, an SR technology may be used to forward a packet between nodes on the service chain. The SR technology is a tunneling technology based on a source route forwarding mode. A head node of a traffic flow is used to specify a path for the packet. The SR technology may be divided into two data planes: multi-protocol label switching (MPLS) and internet protocol version 6 (IPv6), which are respectively referred to as SR-MPLS and an SRv6. When the SR technology is used to forward service data, after determining a tail node of a forwarding path and processing that needs to be performed on the service data, the head node selects an optimal routing segment to form the forwarding path from the head node to the tail node, and correspondingly generates an ordered segment routing identifier list (segment ID list, SID list). The SID list indicates a device that a packet carrying the SID list needs to pass through or processing that needs to be performed on the packet. Then, the head node keeps the SID list in a packet header, generates an SR packet header, and encapsulates the SR packet header and the service data to generate an SR packet. In this way, the nodes on the service chain may forward the SR packet according to the path indicated by the SID list in the SR packet header and process the SR packet. It should be noted that although an SID is the same as a conventional MPLS label or a conventional IPv6 address in a form, the SID is essentially an instruction. In addition to instructing to transmit a packet to a specified device, the SID may be further used to instruct to perform a predefined association operation on the packet on the specified device.

According to a meaning of the SID, a plurality of SID types are defined in the SR technology to indicate different processing on the SR packet. When the SFF is configured on the service chain, an SID configuration table is configured in the SFF. The SID configuration table is used to indicate mapping relationships between SIDs of different fields and different SID types. After receiving the packet, the SFF parses a packet header of the packet to obtain a currently active segment routing identifier (active SID), and queries the SID configuration table by using a field value of the active SID. If a corresponding SID type is found, the SFF determines, according to a protocol, an operation corresponding to the SID type, so as to forward or process the packet. If a corresponding SID type is not found in the SID configuration table, the SFF uses the active SID as a conventional MPLS label or a conventional IPv6 address to query a local IPv6 address forwarding table or a local MPLS label forwarding table, so as to determine the next hop, and forwards the packet to the next hop.

Parsing of the SR packet header needs to be supported by a corresponding device. Currently, to ensure that a device that does not support the SR technology on the service chain is more compatible, a plurality of SR proxy modes are defined in the SR technology. Therefore, the packet using the SR technology is normally forwarded and processed on the service chain.

Figure 2:
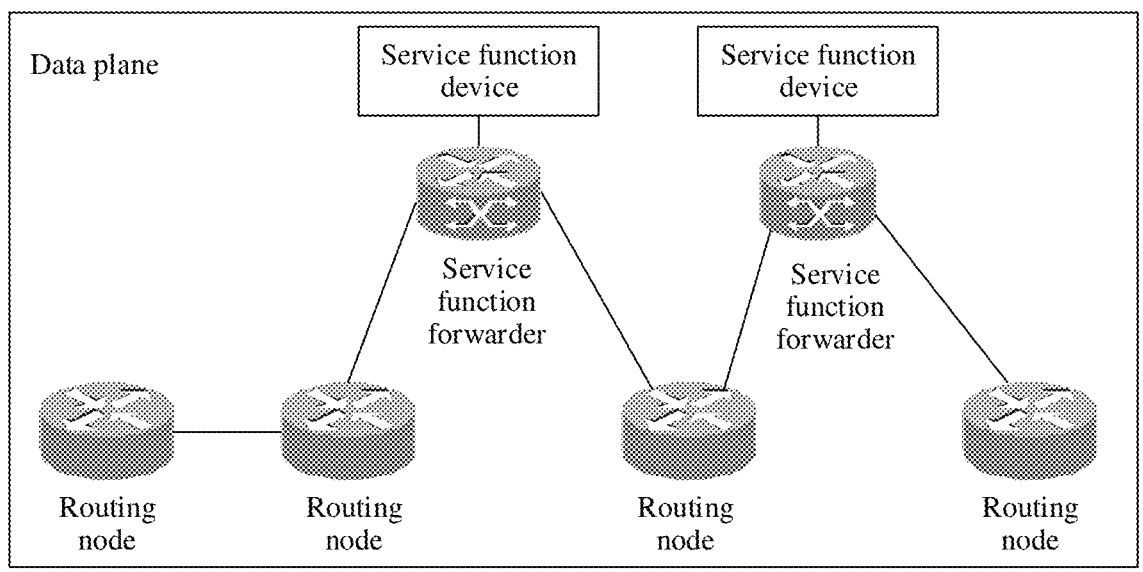
FIG. 2 is a schematic diagram of a general structure of an SR proxy in the conventional technology according to an embodiment.

FIG. 2 is a schematic diagram of a general architecture of an SR proxy defined in the conventional technology. In FIG. 2, after a service function forwarder receives a segment routing (SR) packet, because a service function (SF) device connected to the service function forwarder does not support an SR technology, the SFF converts the SR packet into a non-segment routing (non-SR) packet that can be parsed by the SF, and sends the non-segment routing (non-SR) packet to the SF. Then, the SFF restores a non-SR packet that is returned and that is processed by the SF to an SR packet and forwards the packet on a service chain. For example, SR proxy technologies may be further classified into a plurality of types of proxies, such as a static proxy, a dynamic proxy, a shared-memory proxy, and a masquerading proxy. Currently, the most widely used SR proxy technology is an SR dynamic proxy technology. An SFF stores an SR packet header of a first SR packet received from a previous node and replaces the SR packet header of the first SR packet with a non-SR packet header that can be parsed by an SF, to obtain a first non-SR packet. Then, the SFF sends the first non-SR packet to the SF. After the SF processes the first non-SR packet, the SFF receives, from the SF, a processed second non-SR packet. After receiving the second non-SR packet that is returned and processed by the SF, the SFF finds a locally pre-stored SR packet header based on 5-tuple and based on virtual private network identification (VPN ID), replaces a non-SR packet header of the second non-SR packet with the found SR packet header to obtain a second SR packet, and forwards the second SR packet to a next hop. The SR dynamic proxy technology is used, so that a device that does not support the SR technology is more compatible.

According to the preceding analysis, the SR packet is forwarded along a path specified by a head node. If a segment of the path fails in a forwarding process, the SR packet may fail to be forwarded. For this case, currently, a path optimization technology is defined in the SR technology to allow the SR packet to change the forwarding path and bypass the faulty path during forwarding, so as to implement normal forwarding. SR path optimization may include proactive optimization and passive optimization. In the passive optimization, if a link/node/shared risk link group (SRLG) fails during forwarding of the SR packet, a head node of the faulty segment calculates a repair tunnel corresponding to a post-convergence path. Then, the head node directs the forwarded packet to the repair tunnel and forwards the packet to a tail node of the faulty segment through the repair tunnel, to implement 100% local protection. In the proactive optimization, a controller can adjust a forwarding path of a traffic flow at any time according to a user instruction or a specified policy triggered in a link running status.

It should be noted that, if the forwarding path needs to be changed during the path optimization, a packet header of a source SR packet also needs to be changed after the path optimization. If the path optimization is performed on a node that is before the SFF and that is of another SR packet in a same traffic flow as the first SR packet, a packet header of the another SR packet is different from a packet header of the first SR packet. As a result, when the SFF performs a dynamic proxy on the first SR packet, if the SFF receives the another SR packet before receiving the second non-SR packet, the SFF replaces a pre-stored packet header of the first SR packet with the packet header of the another SR packet. Therefore, the SR packet header found by the SFF based on the 5-tuple and the VPN ID is the packet header of the another SR packet. Because the packet header of the another SR packet is different from the packet header of the first SR packet, a subsequent encapsulation error may be caused. In other words, an error occurs in a process of generating the second SR packet and forwarding of a subsequent packet is affected.

Figure 3:
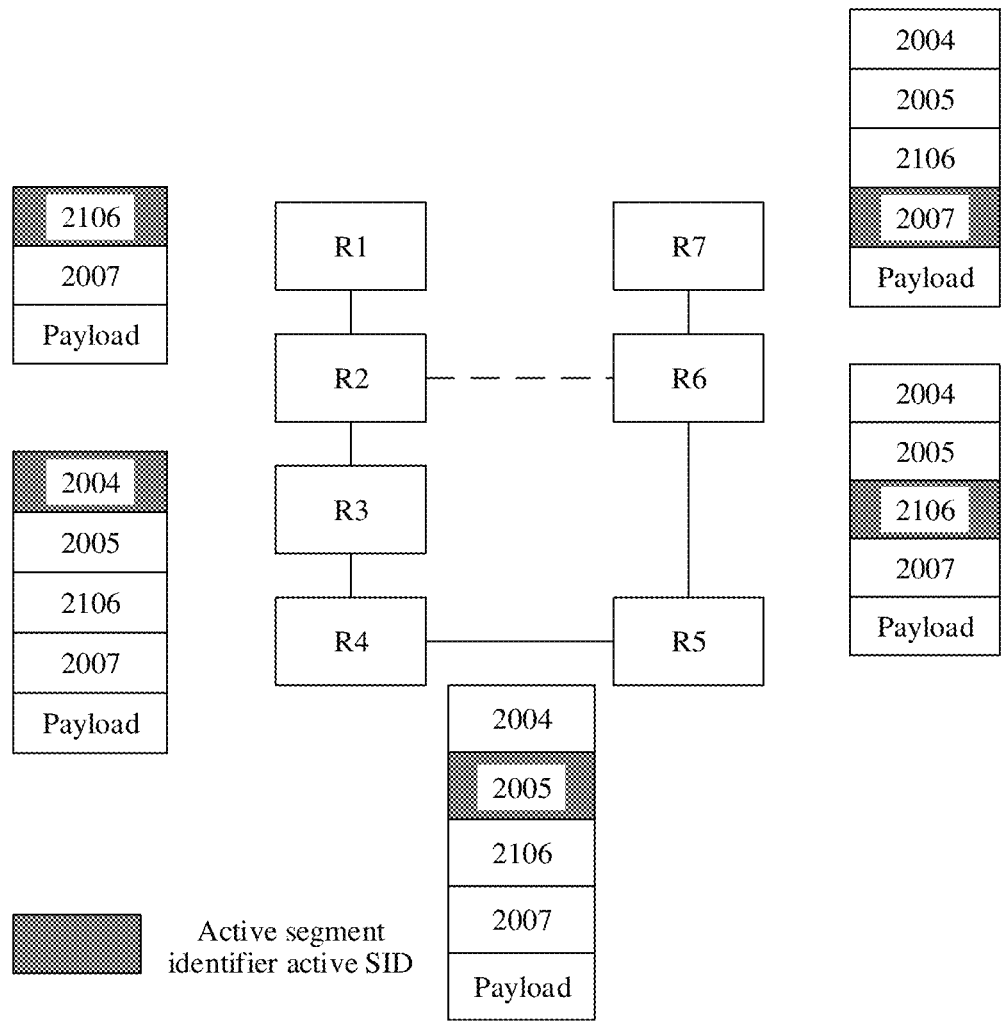
FIG. 3 is a schematic diagram of SR path optimization in the conventional technology according to an embodiment.

FIG. 3 is a schematic diagram of SR path optimization. In FIGS. 3, 2004, 2005, 2106, and 2007 are respectively SIDs of nodes R4, R5, R6, and R7 on a service chain. A device of the node R6 is an SFF having an SR dynamic proxy capability. After receiving an SR packet, R2 determines that a next hop is R6 based on an SID list (2106-2007) in an SR packet header. However, because a tunnel between R2-R6 is a faulty segment or an adjustment segment, the SR packet cannot be directly forwarded to the R6 through R2-R6. Therefore, the node R2 enables a path optimization function and calculates a repair tunnel R4-R5, splices an SID list (2004-2005) corresponding to the repair tunnel to the SID list recorded in the source SR packet header, to obtain a new SR packet header. Therefore, the R2 may send the received packet to the node R6 through the repair tunnel indicated in a new SR packet header. In the schematic diagram of the SR path optimization shown in FIG. 3, if a path between R2-R6 is in a normal state when the node R6 receives a first SR packet, and the path is in an abnormal state (faulty or adjusted) when the node R6 receives a second SR packet of a same traffic flow, it can be understood according to the foregoing description that: a packet header of the first SR packet received by the SFF is different from a packet header of the second SR packet. As a result, when the SFF performs a dynamic proxy on the first SR packet, if the SFF receives the second SR packet before receiving a non-SR packet that corresponds to the first SR packet and that is returned by the SF, the SFF replaces the originally stored first SR packet header of the first SR packet with the second SR packet header of the second SR packet. In this way, after the SFF receives the non-SR packet that corresponds to the first SR packet and that is returned by the SF, the found SR packet header is not the pre-stored first SR packet header. As a result, in a subsequent process of encapsulating an SR packet by using the non-SR packet and the found SR packet header, an encapsulation error may occur, and forwarding of a subsequent packet is affected.

In the foregoing descriptions, the SR packet is used as an example for description. In other words, in the SR dynamic proxy, because the path optimization is performed on the forwarding path, the pre-stored SR packet header is incorrectly replaced. As a result, the packet encapsulation error may be caused. It should be noted that in a packet of another type, a similar case may also occur, that is, a packet header of a first packet is incorrectly replaced during buffering. Consequently, a subsequent encapsulation error is caused, and normal packet forwarding is affected.

Based on the foregoing descriptions, the embodiments provide a packet processing method, to improve a success rate of packet forwarding, and reduce a probability of a case in which the packet forwarding is affected due to an encapsulation error in a packet forwarding process.

Figure 4:
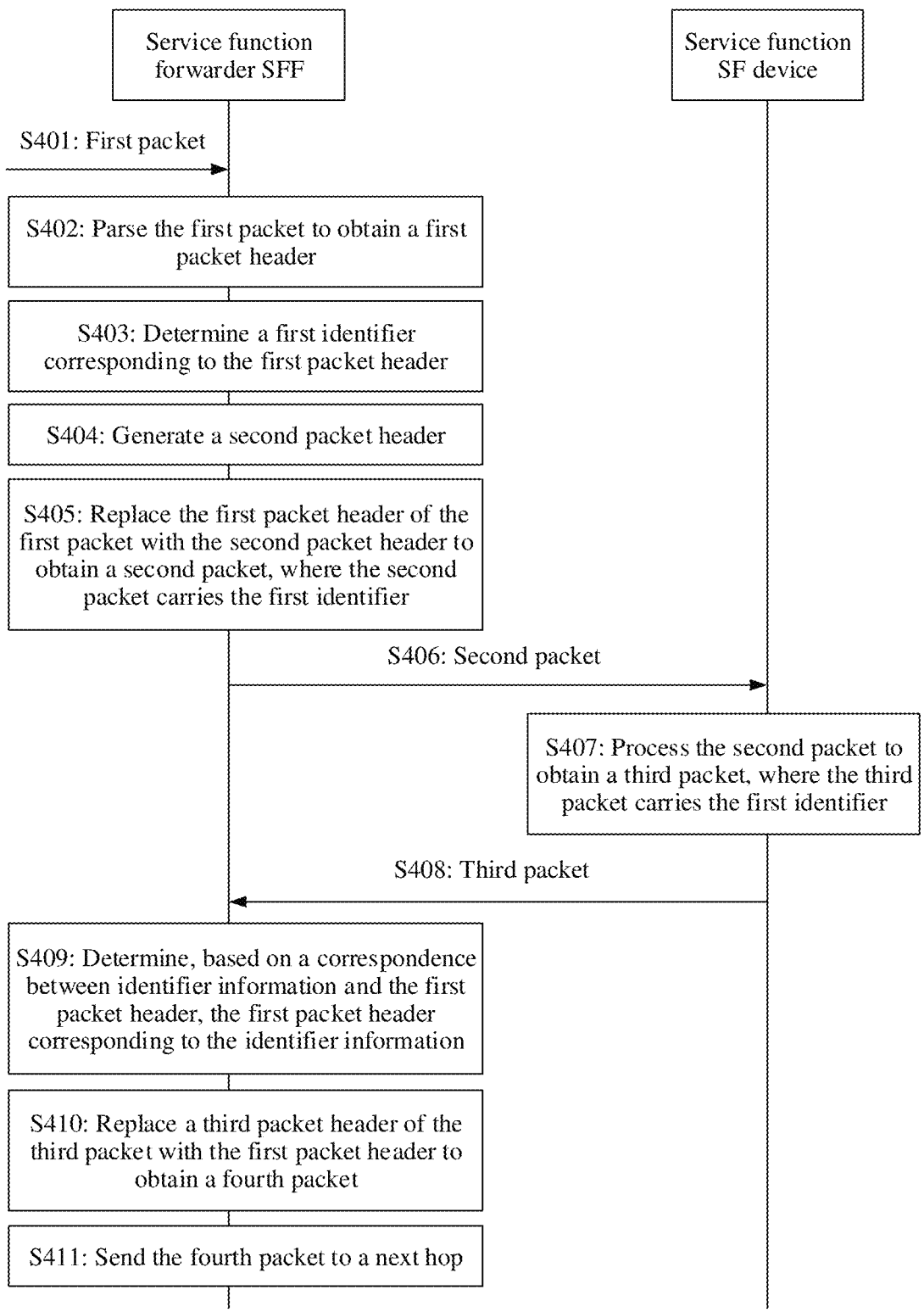
FIG. 4 is a schematic diagram of an embodiment of a packet processing method according to an embodiment.

FIG. 4 is a schematic diagram of an embodiment of a packet processing method. The method may include the following steps.

S401: An SFF receives a packet 1.

In a specific implementation, as a node on a service chain, the SFF may receive, during running, the packet 1 sent by a previous hop.

S402: The SFF parses the packet 1 to obtain a packet header 1.

In a specific implementation, after receiving the packet 1, the SFF parses the packet 1 to obtain the corresponding packet header 1. In this embodiment and subsequent embodiments, an example in which the packet header 1 is an SR packet header is used for description.

S403: The SFF determines a first identifier corresponding to the packet header 1.

In a specific implementation, after obtaining the packet header 1, the SFF determines the first identifier corresponding to the packet header 1. The identifier information may be globally unique identifier information, that is, the identifier information is used to uniquely identify a packet header or may be combined with other information to uniquely identify a packet header. For example, the identifier information may be customized encapsulation type information, and the other information may include VPN ID information in addition to the 5-tuple information.

In a specific implementation, after the step S402 and before the step S403, the method may further include the following step.

A: The SFF determines whether the packet header 1 exists locally.

For example, the SFF may first parse 5-tuple information corresponding to the packet 1, and query, by using the 5-tuple information as an index, whether another packet of a same traffic flow exists locally. If the another packet of the same traffic flow does not exist locally, the SFF determines that the packet header that is the same as the packet header 1 does not exist locally. If there are one or more packet headers, the SFF performs binary comparison between the packet header 1 and the packet headers of other packets. If there is a matched packet header, the SFF determines that the packet header 1 exists locally. Otherwise, the SFF determines that the packet header 1 does not exist locally. It should be noted that, if the packet header 1 further includes VPN ID information, the SFF may first use the 5-tuple information and the VPN ID information as query indexes during the query.

Therefore, the step S403 of determining a first identifier corresponding to the packet header 1 by the SFF includes: if the SFF determines that the packet header 1 exists locally, the SFF queries the preset first identifier corresponding to the packet header 1; or if the SFF determines that the packet header 1 does not exist locally, the SFF stores the packet header 1, and allocates the corresponding first identifier to the packet header 1.

For example, after receiving a packet sent by the previous hop, when storing a packet header of the packet, the SFF separately allocates corresponding identifier information to cache entries of different packet headers, and locally stores mapping relationships between the different cache entries and different identifier information. Therefore, if the SFF determines that the packet header 1 exists locally, the SFF determines, based on a cache entry of the packet header 1 and the mapping relationships, the first identifier corresponding to the packet header 1. A cache entry of a packet header may be formed by information included in some specific fields in the packet header. For example, if an SRv6 packet header includes an IPv6 basic header and an extension header, a cache entry may be formed by content included in specific fields extracted from an IPv6 basic header and an extension header in each SRv6 packet header according to a preset cache entry generation rule, and 5-tuple information and/or VPN ID information of the packet. A cache entry generation rule may be preset and is a common technology at present. Details are not described herein.

In the foregoing descriptions, whether the packet header 1 exists in the SFF is determined. If the packet header 1 exists in the SFF, the first identifier corresponding to the packet header 1 is directly obtained through query and does not need to be stored. If the packet header 1 does not exist in the SFF, the packet header 1 is stored, and the corresponding first identifier is allocated to the packet header 1. Whether the packet header 1 exists in the SFF is determined, and then whether to store the packet header 1 is determined, to avoid repeated buffering of the packet header 1, and reduce storage pressure of the SFF device.

In a specific implementation, after the step S402 and before the step A, the method may further include the following step.

B: A network device determines whether the network device is the SFF.

For example, the network device determines, based on whether the packet header 1 meets a preset rule, whether the network device is the SFF. The network device may be, for example, a router or a switch.

For example, after obtaining the packet header 1 through parsing, the network device determines whether the packet header 1 meets the preset rule. For example, whether the packet header 1 is a packet header that can be parsed by an SF may be determined. For example, it may be determined by judging whether a specific field of the packet header 1 is a preset specific field.

An example in which the packet header 1 is an SR packet header is used for description. In some possible scenarios, for example, the preset rule may be determining whether an SR dynamic proxy needs to be performed for the packet header 1. If the SR dynamic proxy needs to be performed, the preset rule is met. If the SR dynamic proxy does not need to be performed, the preset rule is not met. For example, an SRv6 packet is used as an example. The network device extracts an active SID from the packet header 1 and uses the active SID as a destination address to query a local SID configuration table. A schematic table of the SID configuration table is shown in Table 1. The network device determines, based on an active SID field, whether an indicated SID type is a type that the SR dynamic proxy needs to be performed.

TABLE 1

| active SID | SID type | Remarks |
| --- | --- | --- |
| A::1 | End.AD | Enter an SRv6 dynamic proxy process |
| A::2 | End.DT4 | Enters an IPv4 VPN processing process |
| A::3 | End.DX2 | Enter a two-layer VPN processing process |

As shown in Table 1, End.AD in an SID type is a type that the SR dynamic proxy needs to be performed. When the SFF determines that the active SID field in the packet header 1 includes an A::1 field, the SFF determines, based on the SID configuration table shown in Table 1, to perform the SR dynamic proxy. In this case, the packet header 1 meets the preset rule. It should be noted that SR can divide SR packets into an SRv6 packet and an MPLS-SR packet based on a data plane. The foregoing uses an SRv6 as an example for description. An implementation in an MPLS-SR scenario is similar to that in the SRv6 scenario. A main difference lies in an SID format. Details are not described herein again.

S404: The SFF generates a packet header 2.

In a specific implementation, after obtaining the packet header 1 through parsing, the SFF determines a packet type supported by the SF that needs to process the packet 1, so as to generate the packet header 2 that can be parsed by the SF. The packet header 2 may correspond to a tunnel connected between the SFF and the SF. For example, the packet header 2 may be one of a virtual extensible local area network (VXLAN) header, a virtual extensible local area network generic protocol extension (VXLAN generic protocol extension, VXLAN-GPE) header, a network virtualization protocol (Geneve) header, a generic routing encapsulation (GRE) header, and an IPv6 header.

An example in which the packet header 1 is an SRv6 packet header is used for description. It can be understood from the content described in the step B, the SFF first determines, based on the SID configuration table, that the type of the active SID in the packet header 1 is the type that the SR dynamic proxy needs to be performed. In this case, the SFF may further query a preconfigured encapsulation table by using the active SID field. The encapsulation table is shown in the following Table 2.

TABLE 2

| active SID | Encap type | Encap params |
| --- | --- | --- |
| A::1 | VXLAN | source-addr = 1.1.1.1, Destination-addr = 2.2.2.2, VNI = 10 |
| B::2 | IPv6 | source-addr = 20A0::1, Destination-addr = 20B0::1 |
| B::3 | VXLAN-GPE | source-addr = 1.2.1.3, Destination-addr = 2.1.2.13, VNI = 7, Next Protocol = 1 |

According to Table 1 described in the step B, the active SID whose field value is A::1 indicates an SID that the SR dynamic proxy needs to be performed. It is obtained from Table 2 through query that an encapsulation header type (namely, content indicated by an Encap type) of the packet header 2 encapsulated by using the SID is a virtual extensible local area network. Encapsulation header parameters are as follows: source-addr=1.1.1.1, Destination-addr=2.2.2.2, and VNI=10. After determining the information, the SFF generates a corresponding VXLAN header, and writes the determined encapsulation header parameters (namely, the content indicated by Encap params) into the header. The VXLAN header is the packet header 2.

S405: The SFF replaces the packet header 1 of the packet 1 with the packet header 2, to obtain a packet 2, where the packet 2 includes the first identifier.

In a specific implementation, after generating the packet header 2, the SFF strips the packet header 1 of the packet 1 and encapsulates service data of the packet 1 and the packet header 2 to obtain the packet 2. The packet 2 includes the first identifier. For example, the first identifier may be written into a reserved field of the packet header 2 based on different types of the packet header 2.

The following separately describes several main types of the packet header 2:

VXLAN: A VXLAN is a mainstream tunneling technology in data center network. There are several reserved flag bits (R) and two reserved fields (reserved) in a VXLAN header. One of the reserved fields may be used to carry the first identifier.

VXLAN-GPE: A VXLAN-GPE header is extension of the VXLAN header. Different from the VXLAN header, the VXLAN-GPE header reserves a next protocol field, to carry various protocol encapsulations, including an Ethernet header/an internet protocol version 4 (IPv4) header/an IPv6 header/an MPLS header/a network service header (NSH), and the like. For differentiation, a VXLAN-GPE user datagram protocol (UDP) destination port number needs to be set to 4790. Similar to the VXLAN, the reserved field may also be used to carry the first identifier.

Geneve: In addition to being added with a protocol type field, the VXLAN header can further carry optional type-length-value TLV information. A UDP destination port number needs to be set to 6081. Because the Geneve supports carrying the optional TLV, a new TLV type may be defined to carry the first identifier.

GRE: GRE is a general tunneling technology widely used currently. There is a reserved flag bit and a reserved field in a GRE header. Therefore, the reserved field may also be used to carry the first identifier.

IPv6: There is a reserved flow label reserved bit in an IPv6 header. Therefore, the flow label reserved bit may further be used to carry the first identifier.

It should be noted that the foregoing description of carrying the first identifier in the packet header 2 is merely an example for description. For another tunnel type, if similar extensibility also exists in the header, refer to the foregoing extension definition. Details are not described one by one herein.

In addition, after the packet 2 is set to be included with the first identifier, both the SFF and the SF need to perform related modification on a basis of supporting an existing tunneling technology, so that devices can read or modify the first identifier stored in the reserved field.

In addition, in the foregoing descriptions, because there are different lengths of reserved fields in the packet header 2 of different tunnel types, in actual application, the first identifier and a second identifier need to be designed based on lengths supported by the reserved fields in the different tunnels.

In a specific implementation, the packet 2 may further carry the second identifier. The second identifier is used to indicate the SF to read the first identifier according to indication of the second identifier. For example, the second identifier may be preset to a preset value and is used to indicate the SF to read the first identifier from the packet 2 after the SF determines that the second identifier is the preset value. A manner of carrying the second identifier is similar to a manner of carrying the first identifier. Details are not described herein again.

S406: The SFF sends the packet 2 to the SF.

In a specific implementation, after generating the packet 2, the SFF sends the packet 2 to the SF.

S407: The SF processes the packet 2 to obtain a packet 3, where the packet 3 includes the first identifier.

In a specific implementation, after receiving the packet 2, the SF parses the packet 2 to obtain the service data and the first identifier, and then processes the carried service data based on the packet header 2. For example, when the service data is a plurality of pieces of network address information, the SF filters (firewall) the plurality of network address links according to a preset rule, performs address translation, or the like, to obtain processed service data. In a process in which the SF processes the service data, based on different processing types, the packet header 2 may be modified or not modified to obtain the packet header 3. The packet header 3 may be the same as or different from the packet header 2. After processing the packet 2, the SF adds the first identifier to the packet 3 and encapsulates the packet header 3 and the processed service data to obtain the packet 3.

In a specific implementation, the packet 2 further includes the second identifier. After receiving the packet 2, the SF obtains, based on the second identifier, the first identifier carried in packet 2, and adds the first identifier to the packet 3. For example, after the SF reads the second identifier, if the SF determines that the second identifier is the preset value, the SF reads the first identifier carried in the packet 2 and adds the first identifier to the generated packet 3. A manner of adding the first identifier to the packet 3 is similar to the manner of adding the first identifier in the packet 2 in the step S405. Details are not described herein again.

In a specific implementation, the packet 3 also includes a third identifier. When generating the packet 3, the SF adds the third identifier to the packet 3. The third identifier is used to indicate the SFF to read the first identifier according to indication of the third identifier. For example, the third identifier may be a preset value, and is used to indicate the SFF to read, when the third identifier is the preset value, the first identifier carried in the packet 3. A manner of carrying the third identifier is similar to the manner of carrying the first identifier in the packet 2 in the step S405. Details are not described herein again.

S408: The SF sends the packet 3 to the SFF.

In a specific implementation, after generating the packet 3, the SF sends the packet 3 to the SFF.

S409: The SFF determines, based on a mapping relationship between the first identifier and the packet header 1, the packet header 1 corresponding to the first identifier.

In a specific implementation, after receiving the packet 3, the SFF parses the packet 3 to obtain the first identifier carried in the packet 3, and then determines the local packet header 1 through query based on the first identifier and the mapping relationship between the first identifier and the packet header 1.

In a specific implementation, the packet 3 also includes the third identifier, and the third identifier is the preset value. Therefore, when determining that the third identifier is the preset value, the SFF reads the first identifier carried in the packet 3.

S410: The SFF replaces a packet header 3 of the packet 3 with the packet header 1 to obtain a packet 4.

In a specific implementation, after the SFF determines the packet header 1, the SFF encapsulates the processed service data carried in the packet 3 and the packet header 1 obtained through query to obtain the packet 4.

S411: The SFF sends the packet 4 to a next hop.

In this embodiment, after generating the packet 4, the SFF determines the next hop based on a destination address in the packet header 1 and sends the packet 4 to the next hop.

It can be understood from the foregoing solution that this embodiment has the following advantages:

After receiving the packet 1 sent by the previous hop, the SFF replaces the packet header 1 of the packet 1 with the packet header 2 that can be identified by the SF, to obtain the packet 2. The packet 2 includes the first identifier corresponding to the packet header 1. Then, the SFF sends the packet 2 to the SF. The packet 2 may be parsed and processed by the SF. When the SFF receives the packet 3 obtained after the SF processes the packet header 2, the packet 3 further includes the first identifier. Therefore, the SFF may obtain the prestored packet header 1 through query based on the first identifier to generate the packet 4, and then forward the packet 4 to the next hop. The foregoing manner implements processing performed by the SF on the packet 1 and avoids a case in the conventional technology in which a packet 4 encapsulation error is caused by an error in querying the packet header 1.

Figure 5:
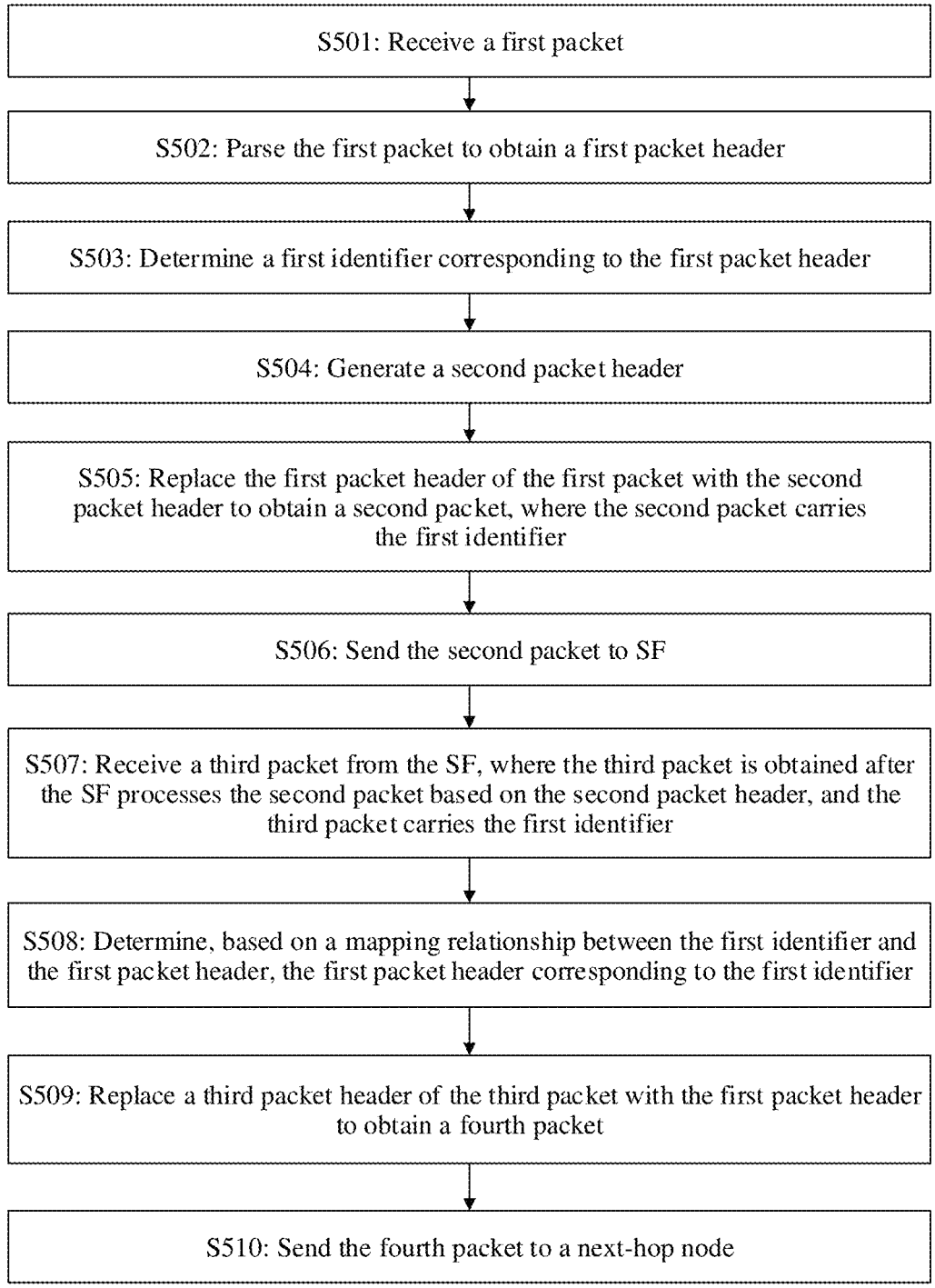
FIG. 5 is a schematic diagram of an embodiment of a packet processing method according to an embodiment.

For example, FIG. 5 is a schematic diagram of another embodiment of a packet processing method. The method may include the following steps.

S501: An SFF receives a first packet.

S502: The SFF parses the first packet to obtain a first packet header.

S503: The SFF determines a first identifier corresponding to the first packet header.

S504: The SFF generates a second packet header.

S505: The SFF replaces the first packet header of the first packet with the second packet header to obtain a second packet, where the second packet includes the first identifier.

S506: The SFF sends the second packet to an SF.

It should be noted that the step S501 to the step 506 are similar to the step S401 to the step S406 in the embodiment shown in FIG. 4. Details are not described herein again. In addition, the first packet corresponds to the packet 1 in the embodiment shown in FIG. 4. The first packet header corresponds to the packet header 1 in the embodiment shown in FIG. 4. The second packet corresponds to the packet 2 in the embodiment shown in FIG. 4. The second packet header corresponds to the packet header 2 in the embodiment shown in FIG. 4.

S507: The SFF receives a third packet from the SF, where the third packet is obtained after the SF processes the second packet based on the second packet header, and the third packet includes the first identifier.

In a specific implementation, the SFF receives the third packet obtained after the SF processes the second packet based on the second packet header. The third packet includes the first identifier.

S508: The SFF determines, based on a mapping relationship between the first identifier and the first packet header, the first packet header corresponding to the first identifier.

S509: The SFF replaces a third packet header of the third packet with the first packet header to obtain a fourth packet.

S510: The SFF sends the fourth packet to a next-hop node.

It should be noted that the step S508 to the step 510 are similar to the step S409 to the step S411 in the embodiment shown in FIG. 4. Details are not described herein again. In addition, the third packet, the third packet header, and the fourth packet are respectively equivalent to the packet 3, the packet header 3, and the packet 4 in the embodiment shown in FIG. 4.

It can be understood from the foregoing solution that this embodiment has the following advantages:

After receiving the first packet sent by a previous hop, the SFF replaces the first packet header of the first packet with the second packet header that can be identified by the SF to obtain the second packet. The second packet includes the first identifier corresponding to the first packet header. Then, the SFF sends the second packet to the SF. The second packet may be parsed and processed by the SF. When the SFF receives the third packet obtained after the SF processes the second packet header, the third packet further includes the first identifier. Therefore, the SFF may obtain the prestored first packet header through query based on the first identifier to generate the fourth packet, and then forward the fourth packet to a next hop. The foregoing manner implements processing performed by the SF on the first packet and avoids a case in the conventional technology in which a fourth packet encapsulation error is caused by an error in querying the first packet header.

Figure 6:
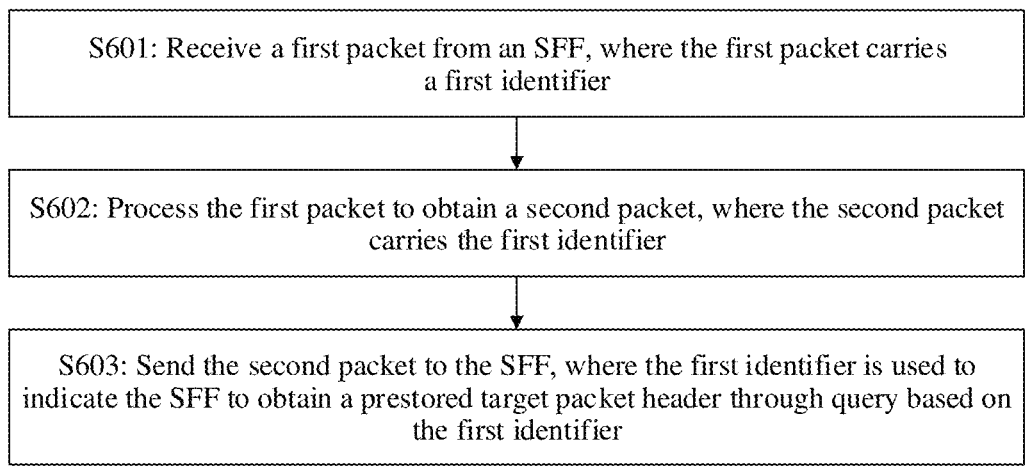
FIG. 6 is a schematic diagram of an embodiment of a packet processing method according to an embodiment.

For example, FIG. 6 is a schematic diagram of another embodiment of a packet processing method. The method may include the following steps.

S601: An SF receives a first packet from an SFF, where the first packet includes a first identifier.

In a specific implementation, the SF receives the first packet from the SFF, and locally stores the first packet. The first packet includes the first identifier.

S602: The SF processes the first packet to obtain a second packet, where the second packet includes the first identifier.

S603: The SF sends the second packet to the SFF, where the first identifier is used to instruct the SFF to obtain a prestored target packet header through query based on the first identifier.

It should be noted that the step S602 and the step S603 are similar to the step S407 and the step S408 in the embodiment shown in FIG. 4. Details are not described herein again. The first packet, the second packet, and the target packet header correspond to the packet 2, the packet 3, and the first packet header respectively in the embodiment shown in FIG. 4.

It can be understood from the foregoing solution that this embodiment has the following advantages:

The SF receives the first packet sent by the SFF. The first packet includes the first identifier. The SF processes the first packet to obtain the second packet and adds the first identifier in the second packet. Then, the SF sends the second packet to the SFF, so that after obtaining the second packet, the SFF may obtain the locally prestored target packet header through query based on the first identifier carried in the second packet, and then the SFF completes a subsequent encapsulation operation. The foregoing method avoids a case in which an encapsulation error is finally caused by an error in querying the target packet header by the SFF.

It should be noted that types of the packet header 1, the packet header 2, and the packet header 3 are not limited in the embodiments, provided that the SFF device can convert a packet header that cannot be identified by the SF into a packet header type that can be identified by the SF. Specific types of the packet header 1, the packet header 2, and the packet header 3 listed in this embodiment are merely examples for description, and should not be understood as a limitation.

Figure 7:
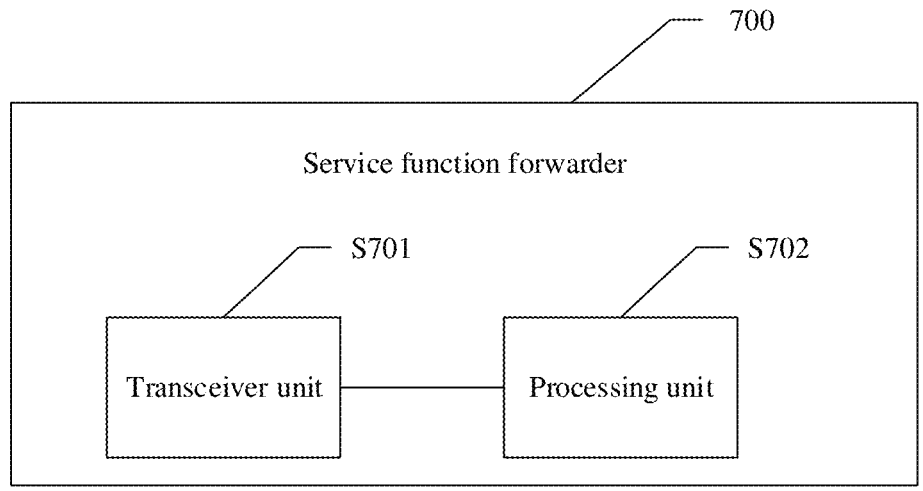
FIG. 7 is a schematic diagram of an embodiment of a service function forwarder according to an embodiment.

FIG. 7 is a schematic diagram of an embodiment of a service function forwarder 700 according to an embodiment. The service function forwarder 700 may include:

a transceiver unit S701, configured to receive a first packet; and a processing unit S702, configured to replace a first packet header of the first packet with a second packet header to obtain a second packet, where the second packet includes a first identifier.

The transceiver unit S701 is further configured to send the second packet to a service function (SF) device; and receive a third packet from the SF. The third packet is obtained after the SF processes the second packet based on the second packet header. The third packet includes the first identifier.

The processing unit S702 is further configured to determine, based on a mapping relationship between the first identifier and the first packet header, the first packet header corresponding to the first identifier; and replace a third packet header of the third packet with the first packet header to obtain a fourth packet.

The transceiver unit S701 is further configured to send the fourth packet to a next-hop node.

In a specific implementation, the first packet header is a segment routing (SR) packet header.

In a specific embodiment, the first packet header is a packet header that cannot be parsed by the SF.

In a specific implementation, the processing unit S702 is further configured to: if the first packet header exists locally, determine the first identifier based on the preset mapping relationship between the first packet header and the first identifier; or if the first packet header does not exist locally, allocate the first identifier to the first packet header, and store the mapping relationship between the first identifier and the first packet header.

In a specific implementation, the second packet further includes a second identifier. The second identifier is used to indicate that the second packet includes the first identifier and instruct to add the first identifier to the third packet.

In a specific implementation, the third packet further includes a third identifier.

The processing unit S702 is further configured to obtain the first identifier according to indication of the third identifier.

Figure 8:
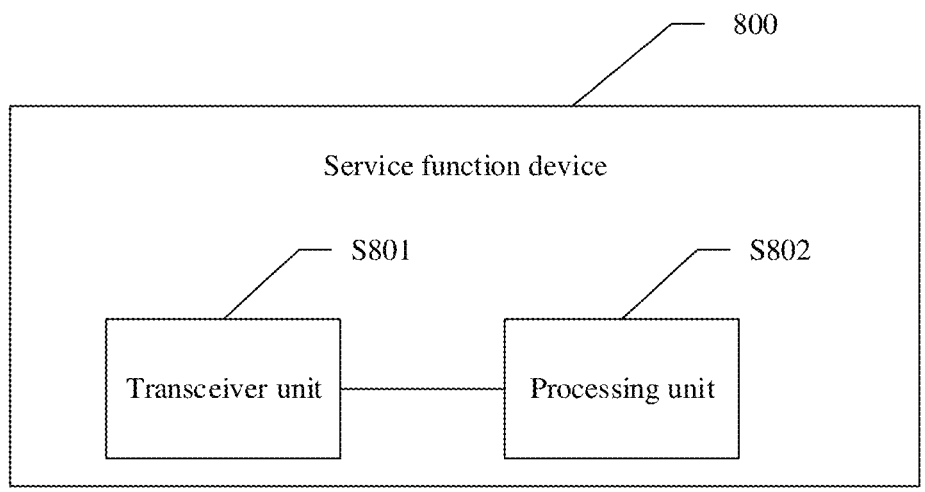
FIG. 8 is a schematic diagram of an embodiment of a service function device according to an embodiment.

FIG. 8 is a schematic diagram of an embodiment of a service function device 800 according to an embodiment. The service function device 800 may include:
- a transceiver unit S801, configured to receive a first packet from a service function forwarder (SFF), where the first packet includes a first identifier; and
- a processing unit S802, configured to process the first packet based on a packet header of the first packet to obtain a second packet.

The transceiver unit is further configured to send the second packet to the SFF. The second packet includes the first identifier. The first identifier is used to instruct the SFF to obtain a prestored target packet header through query based on the first identifier.

In a specific implementation, the target packet header is a segment routing (SR) packet header.

In a specific implementation, the first packet also includes a second identifier.

The transceiver unit S801 is further configured to obtain the first identifier according to indication of the second identifier and add the first identifier to a third packet.

In a specific implementation, the processing unit S801 is further configured to add a third identifier to the third packet. The third identifier is used to indicate that the first packet includes the first identifier.

Figure 9:
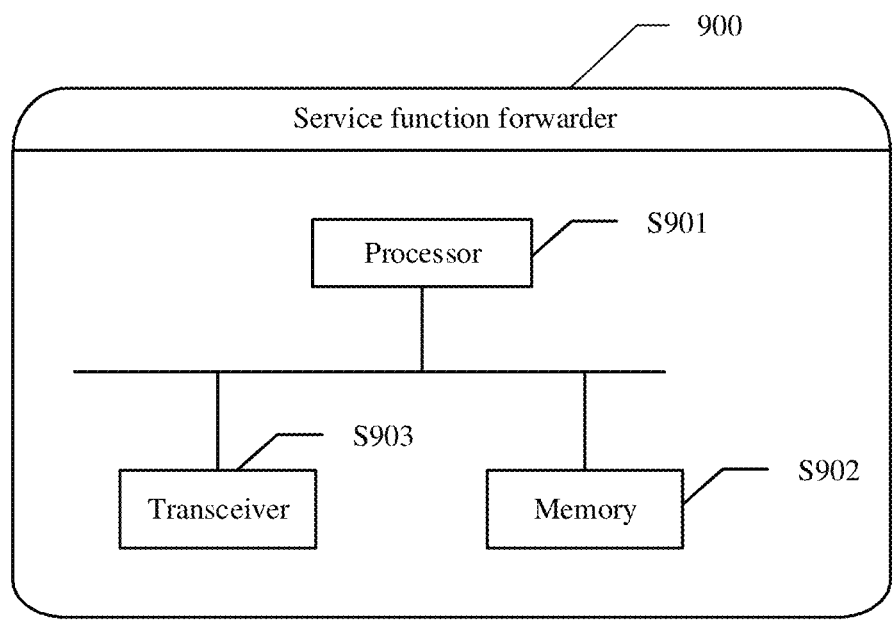
FIG. 9 is a schematic diagram of an embodiment of a service function forwarder according to an embodiment.

FIG. 9 is a schematic diagram of an embodiment of a service function forwarder 900 according to an embodiment. The service function forwarder 900 may include:
- a processor S901, a memory S902, and a transceiver S903, where the processor S901 and the transceiver S903 are connected to the memory S902.

The transceiver S903 is configured to receive a first packet and store the first packet in the memory S902.

The processor S901 is configured to read the first packet from the memory S902, replace a first packet header of the first packet with a second packet header to obtain a second packet. The second packet includes a first identifier.

The transceiver S903 is further configured to obtain the second packet from the memory S902, send the second packet to a service function (SF) device, receive a third packet from the SF, and store the third packet in the memory S902. The third packet is obtained after the SF processes the second packet based on the second packet header. The third packet includes the first identifier.

The processor S901 is further configured to read the first identifier from the memory S902, determine, based on a mapping relationship between the first identifier and the first packet header, the first packet header that is in the memory S902 and that corresponds to the first identifier, read the third packet from the memory S902, and replace a third packet header of the third packet with the first packet header to obtain a fourth packet.

The transceiver S903 is further configured to obtain the fourth packet from the memory S902 and send the fourth packet to a next-hop node.

In a specific implementation, the first packet header is an SR packet header.

In a specific embodiment, the first packet header is a packet header that cannot be parsed by the SF.

In a specific implementation, the processor S901 is further configured to: if the first packet header exists locally, determine the first identifier based on the preset mapping relationship between the first packet header and the first identifier; or if the first packet header does not exist locally, allocate the first identifier to the first packet header, and store the mapping relationship between the first identifier and the first packet header.

In a specific implementation, the second packet further includes a second identifier. The second identifier is used to indicate that the second packet includes the first identifier and instruct to add the first identifier to the third packet.

The first packet header is a packet header that cannot be parsed by the SF.

The third packet further includes a third identifier. The processor S901 is further configured to obtain the first identifier from the memory S902 according to indication of the third identifier.

Figure 10:
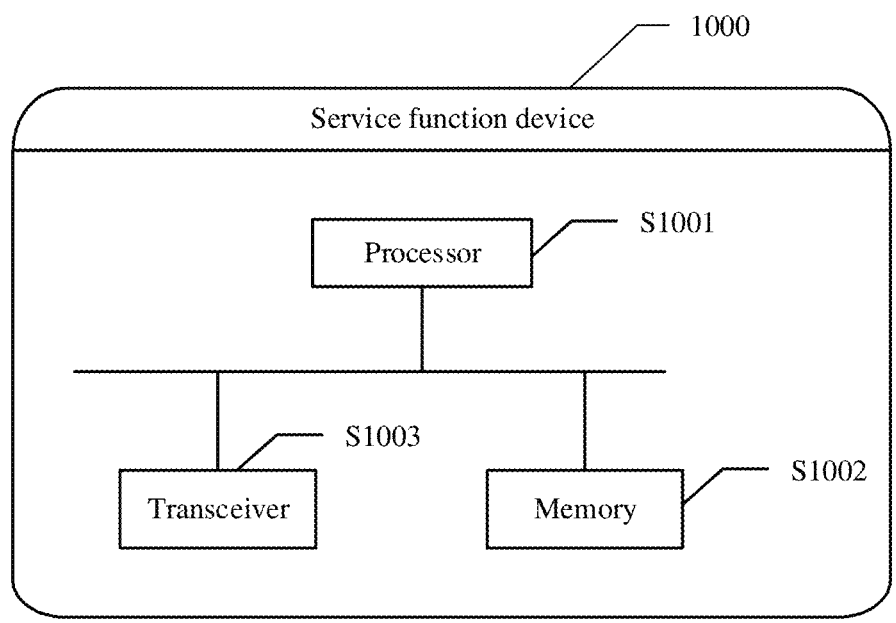
FIG. 10 is a schematic diagram of an embodiment of a service function device according to an embodiment.

FIG. 10 is a schematic diagram of an embodiment of a service function device 1000 according to an embodiment. The service function device 1000 may include:
- a processor S1001, a memory S1002, and a transceiver S1003, where the processor S1001 and the transceiver S1003 are connected to the memory S1002.

The transceiver S1003 is configured to: receive a first packet from a service function forwarder (SFF) and store the first packet in the memory S1002. The first packet includes a first identifier.

The processor S1001 is configured to: read the first packet from the memory S1002 and process the first packet to obtain a second packet.

The transceiver S1003 is further configured to: obtain the second packet from the memory S1002 and send the second packet to the SFF. The second packet includes the first identifier. The first identifier is used to instruct that the SFF obtains a prestored target packet header through query based on the first identifier.

In a specific implementation, the target packet header is a segment routing (SR) packet header.

In a specific implementation, the first packet also includes a second identifier. The processor S1001 is further configured to: read the second identifier from the memory S1002, obtain the first identifier according to indication of the second identifier, and add the first identifier to a third packet.

In a specific implementation, the processor S1001 is further configured to add a third identifier to the third packet. The third identifier is used to indicate that the third packet includes the first identifier.

An embodiment further provides a packet processing system. The system may include:
- a service function forwarder and a service function device.

The service function forwarder includes the service function forwarder described in any step in the embodiment shown in FIG. 4 or FIG. 5.

The service function device includes the service function device described in any step in the embodiment shown in FIG. 4 or FIG. 6.

An embodiment further provides a computer storage medium including instructions. When the instructions are run on a computer, the computer is enabled to perform the method in any specific embodiment in FIG. 4, FIG. 5, and/or FIG. 6.

An embodiment further provides a computer program product including instructions. When the computer program product runs on a computer, the computer is enabled to perform the method in any specific embodiment in FIG. 4, FIG. 5, and/or FIG. 6.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

It may be clearly understood by persons of ordinary skill in the art that, for the purpose of convenient and brief description, for a detailed working process of the foregoing system, apparatus, and unit, refer to a corresponding process in the foregoing method embodiments. Details are not described herein again.

In the several embodiments provided, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual coupling or direct coupling or communication connection may be implemented by using some interfaces. The indirect coupling or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments may be integrated into one processing unit, or each of the units may exist alone physically, or two or more units are integrated into one unit. The integrated unit may be implemented in a form of hardware or may be implemented in a form of a software functional unit.

When the integrated unit is implemented in the form of a software functional unit and sold or used as an independent product, the integrated unit may be stored in a computer-readable storage medium. Based on such an understanding, the solutions of the embodiments essentially, or the part contributing to the conventional technology, or all or some of the solutions may be implemented in the form of a software product. The computer software product is stored in a storage medium and includes several instructions for instructing a computer device (which may be a personal computer, a server, or a network device) to perform all or some of the steps of the methods in the embodiments. The foregoing storage medium includes any medium that can store program code, for example, a USB flash drive, a removable hard disk, a read-only memory (ROM,), a random-access memory (RAM), a magnetic disk, or an optical disc.

The foregoing embodiments are merely intended to describe the solutions, and are non-limiting. Although the embodiments are described in detail, persons of ordinary skill in the art should understand that they may still make modifications to the solutions described in the foregoing embodiments or make equivalent replacements to some features thereof, without departing from the spirit and scope of the solutions of the embodiments.

The foregoing descriptions are merely specific implementations of the embodiments, and are non-limiting.

What is claimed is:

1. A method, implemented by a service function forwarder (SFF) device, the method comprising:
   receiving a first packet comprising a first packet header and a payload;
   storing a mapping relationship between a first identifier and the first packet header locally in a Segment ID (SID) configuration table that indicates mapping relationships between SIDs of different fields and different SID types, wherein the first identifier uniquely identifies the first packet header and the payload;
   replacing the first packet header of the first packet with a second packet header to obtain a second packet, wherein the second packet comprises the first identifier;
   sending the second packet to a service function (SF) device, wherein the second packet header corresponds to a tunnel connected between the SFF device and the SF device;
   receiving a third packet from the SF device, wherein the third packet comprises the first identifier and the payload;
   determining, based on the stored mapping relationship between the first identifier and the first packet header, the first packet header;
   replacing, a third packet header of the third packet with the first packet header to obtain a fourth packet, wherein the fourth packet comprises the payload and the first packet header; and
   sending the fourth packet to a next-hop node.

2. The method according to claim 1, wherein the first packet header is a segment routing (SR) packet header.

3. The method according to claim 1, wherein the first packet header is a packet header that cannot be parsed by the SF device.

4. The method according to claim 1, wherein, before replacing the first packet header of the first packet with the second packet header, the method further comprises:
   allocating, by the SFF device, the first identifier to the first packet header.

5. The method according to claim 1, wherein the second packet further comprises a second identifier which indicates that the second packet comprises the first identifier and instructs the SF device to add the first identifier to the third packet.

6. The method according to claim 1, wherein the third packet further comprises a third identifier which indicates that the third packet comprises the first identifier.

7. A service function forwarder (SFF) device, comprising:
   a memory comprising instructions;
   a processor connected to the memory, wherein when the instructions are executed by the processor, the instructions cause the SFF device to:
   receive a first packet comprising a first packet header and a payload;
   store a mapping relationship between a first identifier and the first packet header locally in a Segment ID (SID) configuration table that indicates mapping relationships between SIDs of different fields and different SID types, wherein the first identifier uniquely identifies the first packet header and the payload;
   replace the first packet header of the first packet with a second packet header to obtain a second packet, wherein the second packet comprises the first identifier;
   send the second packet to a service function (SF) device, wherein the second packet header corresponds to a tunnel connected between the SFF device and the SF device;
   receive a third packet from the SF device, wherein the third packet comprises the first identifier and the payload;
   determine, based on the stored mapping relationship between the first identifier and the first packet header, the first packet header;
   replace, a third packet header of the third packet with the first packet header to obtain a fourth packet, wherein the fourth packet comprises the payload and the first packet header; and
   send the fourth packet to a next-hop node.

8. The SFF device according to claim 7, wherein the first packet header is a segment routing (SR) packet header.

9. The SFF device according to claim 8, wherein the SR packet header is an internet protocol version 6 segment routing (SRv6) packet header.

10. The SFF device according to claim 7, wherein the first packet header is a packet header that cannot be parsed by the SF device.

11. The SFF device according to claim 7, wherein the second packet further comprises a second identifier which indicates that the second packet comprises the first identifier and instructs the SF device to add the first identifier to the third packet.

12. The SFF device according to claim 7, wherein the third packet further comprises a third identifier which indicates that the third packet comprises the first identifier.

13. The SFF device according to claim 7, wherein the first packet is a segment routing (SR) packet, and the second packet is a non-segment routing (non-SR) packet.

14. The SFF device according to claim 7, wherein the first identifier comprises at least one of the following:
   customized encapsulation type information;
   5-tuple information of the first packet; or
   information of the first packet.

* * * * *